Figure 1:
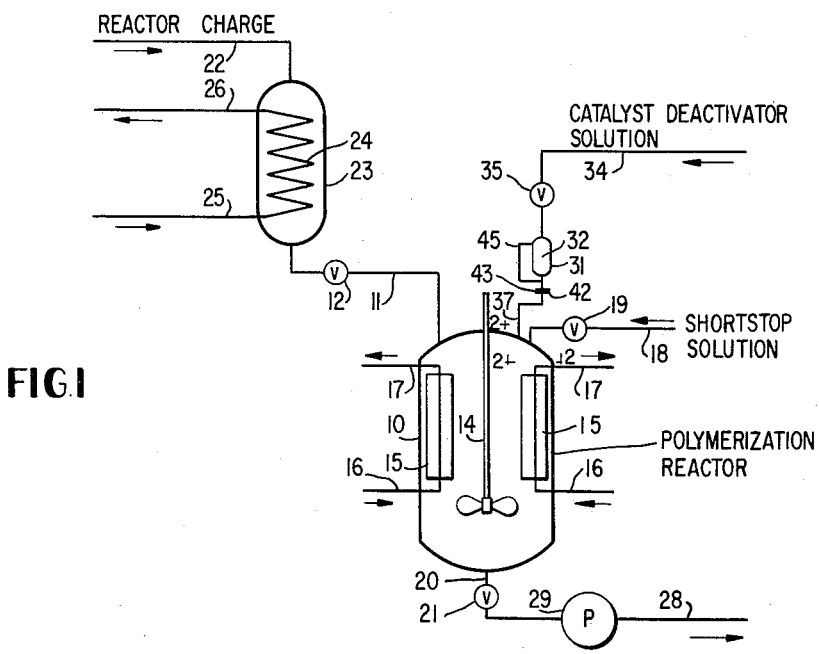

April 28, 1964  R. VAN VOLKENBURGH  3,131,033
APPARATUS FOR PASSING MATERIAL INTO A PRESSURE VESSEL
IN RESPONSE TO THE INTERNAL PRESSURE THEREOF
Filed Dec. 2, 1960

INVENTOR.
ROSS VAN VOLKENBURGH
BY Shanley & O'Neil
ATTORNEYS

United States Patent Office 3,131,033
Patented Apr. 28, 1964

3,131,033
APPARATUS FOR PASSING MATERIAL INTO A PRESSURE VESSEL IN RESPONSE TO THE INTERNAL PRESSURE THEREOF
Ross Van Volkenburgh, Baton Rouge, La., assignor to Copolymer Rubber & Chemical Corporation, a corporation of Louisiana
Filed Dec. 2, 1960, Ser. No. 73,273
10 Claims. (Cl. 23—289)

This invention relates to a novel method and improved apparatus for passing material into a pressure vessel and, in some of its more specific aspects, the invention further relates to a novel method and improved apparatus for controlling chemical reactions.

The present invention will be described and illustrated hereinafter with specific reference to a method and apparatus for controlling the polymerization of olefins. However, those skilled in the art will recognize that the principles of the present invention are applicable to other environments and to other chemical reactions and thus the invention is not limited thereto.

In instances where an exothermic reaction is carried out in a pressure vessel, in liquid phase and in the presence of a volatile material and a catalyst, it is necessary to provide a method and means for controlling runaway reactions. Catalyzed exothermic chemical reactions may be controlled effectively by addition of a catalyst deactivator to the reaction medium, but apparatus available heretofore for adding the catalyst deactivator employed valved connections with which it was impossible to obtain an entirely effective positive seal and small amounts of deactivator leakage caused premature catalyst failure. Even more important, the prior art apparatus was not capable of automatically, rapidly and reliably adding the catalyst deactivator to the reaction mixture at the critical stage after the normal reaction rate is exceeded sufficiently for the reaction to be out of control and before damage results to the pressure reaction vessel. While numerous means have been proposed prior to the present invention for overcoming the above-mentioned difficulties, none have been entirely satisfactory and the art has long sought a satisfactory solution.

The present invention provides a method and apparatus for controlling runaway chemical reactions which includes an entirely effective positive seal between the catalyst deactivator and the reaction mixture whereby it is impossible for leakage or premature addition to occur and thereby cause an unwanted catalyst failure with attendant loss of the reactor contents. Also, the present invention may utilize an increase in pressure in the reaction vessel to automatically and reliably initiate the addition of the catalyst deactivator at the proper time and the design of the apparatus is such that the catalyst deactivator is added rapidly thereby preventing additional pressure build-up in the reaction vessel. Thus, the present invention overcomes the long standing problems of the prior art for the first time.

It is an object of the present invention to provide a novel method and improved apparatus for adding material to a pressure vessel.

It is a further object of the present invention to provide a novel method and improved apparatus for controlling chemical reactions.

It is still a further object of the present invention to provide a novel method and improved apparatus for controlling a catalyzed exothermic chemical reaction in a pressure vessel whereby the reaction is terminated by addition of a catalyst deactivator when the internal pressure of the vessel exceeds a predetermined level.

Figure 2:
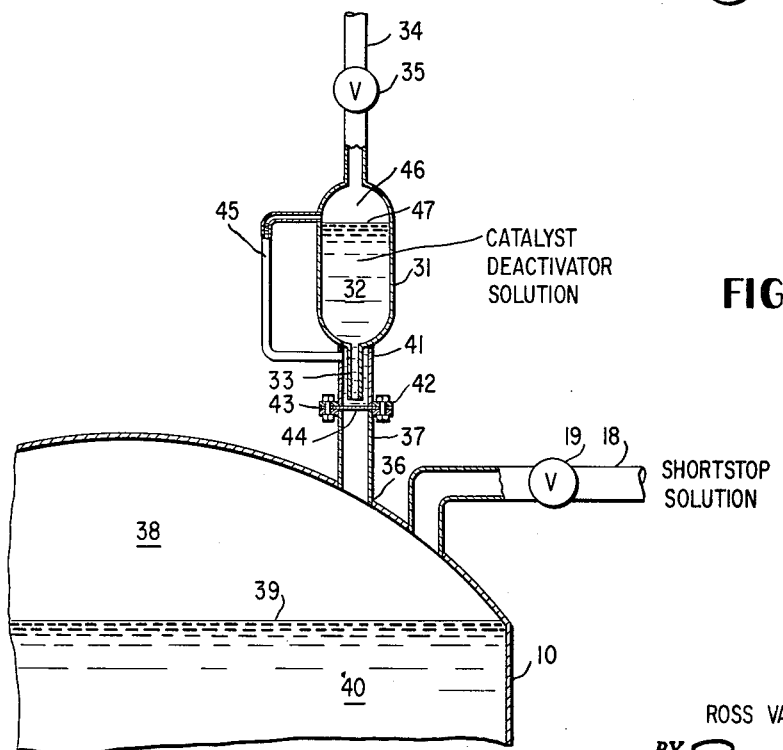

Still other objects and advantages of the present invention will be apparent to those skilled in the art upon reference to the following detailed description, the specific examples, and the drawings wherein:

FIG. 1 diagrammatically illustrates one suitable arrangement of apparatus for practicing the present invention; and FIG. 2 is an enlarged view of a portion of the reactor of FIG. 1 taken along the line 2—2—2 and including the apparatus connected thereto.

Referring now to the drawings, the polymerization reactor 10 may be a pressure vessel suitable for use in polymerizing butadiene and styrene to form synthetic rubber latex by an emulsion polymerization process. The reactor 10 may be provided with an inlet conduit 11 including normally closed control valve 12 for charging reactants and other ingredients comprising a prior art recipe for styrenebutadiene synthetic rubber latex, an agitator 14 which is so constructed and arranged as to assure adequate agitation of the reactor contents, conventional means for controlling the polymerization temperature which may include tube bundles 15 and conduits 16 and 17 for supplying to and withdrawing from, respectively, a controlled quantity of liquefied ammonia or other suitable coolant to maintain a desired polymerization temperature, conduit 18 including normally closed control valve 19 for supplying short-stop solution to the contents when the desired percentage conversion of monomers to polymer is reached and thereby terminate the polymerization, and an outlet conduit 20 including normally closed control valve 21 for withdrawing prepared unstripped synthetic rubber latex. The withdrawn latex may be transferred by means of pump 29 via conduit 28 to prior art latex processing steps such as recovery of unreacted monomers and coagulation to produce solid rubber crumb.

When charging reactor 10, valve 12 in conduit 11 is opened and the reactants and other ingredients comprising a prior art SBR recipe including butadiene, styrene, soap solution, water, initiators or catalysts and regulators or modifiers may be charged to reactor 10 in the usual sequence and desired quantities through conduit 22, precooler 23 and conduit 11. If desired, all of the ingredients except the catalyst solution and a portion of the water may be charged simultaneously to reactor 10 with agitation. Then, the catalyst solution may be charged to reactor 10 followed by the remaining water. A suitable coolant such as cold water at about 33° F. may be supplied to and withdrawn from cooling coil 24 in precooler 23 via conduits 25 and 26 respectively, for the purpose of precooling the reactants and other ingredients charged to reactor 10 to a desired temperature. Preferably, the reactor charge is precooled to a temperature in the vicinity of the polymerization temperature such as about 40–50° F. to thereby reduce the initial thermal load on the temperature control means which may be provided for reactor 10.

After charging reactor 10, valve 12 in conduit 11 is closed and under normal conditions the polymerization may be allowed to proceed with agitation of the reactor contents and close control of the polymerization temperature, preferably at a temperature of about 41° F., until the desired percent conversion of monomers to polymer is reached. The initial reactor pressure of about 10 p.s.i.g. decreases somewhat as the polymerization proceeds under normal conditions due to reaction of a portion of the butadiene. At a suitable stage, e.g., when about 60% of the total weight of the butadiene and styrene charged to reactor 10 is converted to polymer, the polymerization is terminated, i.e., "short-stopped" by opening valve 19 and supplying via conduit 18 an aqueous solution of sodium dimethyldithiocarbamate and sodium polysulfide or other suitable short-stop solution to the contents of reactor 10. The short-stop solution is blended with the unstripped synthetic rubber latex contents of reactor 10 and then valve 21 is opened and the unstripped latex is transferred by means of pump 29 via conduits 20 and 28 to a prior art processing step such as mentioned above.

A vessel 31 containing catalyst deactivator 32 is mounted above reactor 10. The vessel 31 terminates on its lower end in an open conduit or neck portion 33 and is provided on its upper end with conduit 34 including control valve 35. The lower end 36 of conduit 37 is in communication with the vapor space 38 above the liquid level 39 of reactor charge 40, and on its upper end 41 the conduit 37 is attached to vessel 31 in sealing relationship and arranged so as to surround the relatively small diameter neck portion 33. The conduit 37 is provided with flange 42 in which is mounted a frangible rupture disk 43 in liquid-tight relationship. The rupture disk 43 is supported by its edge portions in flange 42 and the central portion 44 is arranged across conduit 37 and forms a liquid seal which normally prevents entry of the catalyst deactivator solution into reactor 10. A conduit 45 extends through the upper end 41 of conduit 37 at a point above the lower end of neck portion 33, and the upper end of conduit 45 is in communication with the vapor space 46 above the liquid level 47 of catalyst deactivator solution 32.

Under normal conditions, the polymerization proceeds as described above with the portion 44 of rupture disk 43 remaining in position and sealing conduit 37. However, if for some reason the polymerization rate should increase to a level whereby the cooling coils 15 are not able to remove the heat of reaction sufficiently fast, or if the cooling coils 15 operate improperly due to mechanical difficulties, then the temperature of the reactor charge 40 rises and there is an accompanying increase in the internal pressure of reactor 10. If the cooling coils 15 continue to not remove the heat of reaction as it is produced, such as would occur under runaway polymerization conditions, the temperature of reactor charge 40 continues to rise and the internal pressure of reactor 10 likewise continues to increase until the vessel ruptures unless steps are taken to prevent this.

The rupture disk 43 is selected so as to assure the rupture of portion 44 upon reaching a desired predetermined pressure level within reactor 10. Upon rupture of portion 44, the catalyst deactivator solution 32 is free to flow rapidly from the vessel 31 via a neck portion 33 and through the ruptured portion 44 of disk 43 and conduit 37 into the reactor charge 40 and thereby deactivate the catalyst and prevent further heat and pressure build-up. While the catalyst deactivator solution is flowing from vessel 31, the pressure within vapor space 38 and vapor space 46 is equalized by means of conduit 45 which is then in communication with each of these vapor spaces. Once the catalyst has been deactivated, the polymerization rate is greatly reduced or even terminated and there is no danger of further build-up in heat and pressure within reactor 10. The reactor charge containing deactivated catalyst then may be withdrawn from the reactor 10 and discarded, a new rupture disk 43 substituted for the old damaged rupture disk, and catalyst deactivator solution withdrawn via conduit 34 upon opening normally closed control valve 35 and passed into vessel 31 to the predetermined level 47. Thereafter, if desired, a fresh reactor charge may be passed into reactor 10 and the fresh charge polymerized after any necessary steps have been taken to eliminate the cause for the runaway polymerization conditions.

From the foregoing discussion, it is apparent that the reactor 10 remains undamaged and is protected from damage automatically. Thus the usefulness of the safety apparatus is evident in liquid phase catalyzed exothermic chemical reactions carried out in a pressure vessel in which temperature control has been lost. Failure of proper temperature control may be due to any number of different reasons such as excessive amounts of catalyst charged to the reaction mixture, power failures, failure of the cooling stream or excessive fouling of the cooling coil surfaces, or other reasons.

The apparatus and method of the present invention is especially useful in controlling liquid phase catalyzed chemical reactions which are exothermic in nature, and where the reaction mixture contains (1) sufficient volatile materials, whether reactant, solvent or other source, to cause a pressure build-up at runaway reaction conditions; (2) concentrations of reactants such that if the reaction were to proceed at very fast rates, then the heat released during reaction would be appreciably higher than the rate of heat removal by cooling and enough to cause heat and pressure build-up due to volatilization of reactant, solvent, or other ingredient; and (3) the catalyst is sensitive to the presence of minor amounts of selected additives which, when added to the reaction mixture, will reduce the reaction rate or kill the catalyst while liberating relatively small amounts of heat and, preferably, which will not react to an appreciable extent with products already formed.

Examples of catalyzed chemical reactions which may be carried out in accordance with the present invention are emulsion, suspension, solution and bulk polymerizations, and the catalyst may be of the free radical, anionic or cationic type. The polymerizable material for use in the polymerization may be a catalytically polymerizable olefin such as butadiene, isoprene, ethylene, propylene, aliphatic alpha olefins, vinyl chloride, isobutylene and styrene, and polymerizable mixtures thereof.

The apparatus and method of the present invention are especially useful in the solution polymerization of butadiene to produce polybutadiene, and in the emulsion polymerization of a suitable polymerizable material to produce synthetic rubber latices. Examples of polymerizable materials which are especially suitable for use in solution or emulsion polymerizations are the various 1,3-butadienes, such as 1,3-butadiene, methyl-2-butadiene-1,3, piperylene, and 2,3-dimethyl-butadiene-1,3. If desired, the polymerizable material for solution or emulsion polymerization may be a mixture of a 1,3-butadiene above-mentioned with another polymerizable compound which is capable of forming rubbery copolymers therewith. For example, such polymerizable mixtures may contain up to 50% or higher of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1,3-butadienes are the aryl olefins such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene; methyl vinylether; and methyl vinylketone.

The reactor 10 may be any suitable pressure vessel which is closed off to the atmosphere and capable of withstanding a suitable internal pressure which is sufficient to effect the desired chemical reaction. In emulsion polymerization, the conduit 18 including valve 19 is desirable for supplying shortstop solution to effect normal termination of the polymerization; however, in solution polymerization preferably the conduit 18 and valve 19 are eliminated or retained and maintained free of shortstop solution, as even small leakages of shortstop solution past valve 19 and into the reactor contents destroys the catalyst charge and thus is highly undesirable.

The catalyst deactivator vessel 31 is preferably closed off to the atmosphere and capable of withstanding the pressure to which the reactor 10 is subjected. The vapor space 46 of vessel 31 may be normally at substantially atmospheric pressure if desired. The catalyst deactivator present in solution 32 in vessel 31 should be selected from substances known to be deactivators for the specific catalyst to be used and present in sufficient amount to substantially reduce or even terminate the reaction within reactor 10, and thus upon addition to charge 40 the catalyst content is sharply reduced in activity or completely deactivated.

The rupture disk 43 may be formed of a frangible material and of a conventional structure which is designed to assure rupture at a predetermined pressure within space 38 of reactor 10. Preferably, the rupture disk 43 is a preformed thin metal disk of a construction which provides instantaneous release of fluid pressure when a predetermined differential pressure is reached. Relief is provided through the preformed metal disk which ruptures upon exposure to differential pressures beyond a predetermined maximum within, for example, a processing or storage vessel. Such rupture disks are available commercially and types which have proved to be especially useful are models 1A, 1B, D and DV marketed by Black, Sivalls and Bryson, Incorporated. However, other suitable rupture disks may be used.

The foregoing detailed discussion and the following specific examples are for purposes of illustration only and are not limiting to the spirit or scope of the appended claims.

*Example I*

This example illustrates normal solution polymerization of butadiene to produce cis-1,4-polybutadiene.

A clean, dry 1 gallon stainless steel autoclave fitted with a stirrer, cooling coil, thermocouple well, dip tube, pressure gage, rupture disk and relief line, inlet and drain connections, was flushed with dry nitrogen and 1500 grams of pure dry oxygen-free benzene were added. A catalyst solution prepared in a separate container from 1.39 grams (.0025 mol) of titanium tetraiodide dispersed in a heavy hydrocarbon, 0.57 gram (.0050 mol) of triethyl aluminum and 100 grams of dry benzene, was then pressured into the reactor while taking precautions to exclude moisture and oxygen in transfer lines.

The catalyst-solvent mixture was stirred and cooled to 77° F. by cooling water through the coil, and then 400 grams (7.4 mols) of dry butadiene were added. The pressure was increased to 25 p.s.i.g. using dry nitrogen while stirring and maintaining cooling water through the coils. The temperature of the batch increased slowly under these conditions at first, and then more rapidly until after 45 minutes a maximum temperature of 123° F. was reached. The temperature then slowly dropped to about 80° F. during the following 3¼ hours. The pressure on the reactor was maintained at about 25 p.s.i.g. throughout the polymerization.

The resultant polymer solution was withdrawn and methanol added thereto for the purpose of deactivating the catalyst and coagulating the polymer. The solid polymer thus obtained was washed with methanol, water, and dried to yield a pale, tan crumb of polybutadiene in which the residual olefin linkages existed mainly (92%) in a cis configuration.

*Example II*

This example illustrates control of a runaway solution polymerization using equipment as described in Example I and a reactor charge as described in Example I, except that no cooling means is used to control the reaction temperature and safety apparatus is installed similar to vessel 31, conduit 37, rupture disk 43 and associated apparatus as illustrated in FIGS. 1 and 2 of the drawing. The vessel 31 contains 50 cc. of methanol and is arranged above rupture disk 43 and set for rupture at 50 p.s.i.g.

Polymerization proceeds slowly at first, but the rate of polymerization increases rapidly as the temperature increases until after a short interval such as 10–15 minutes, when about 60% of the butadiene present is reacted, the heat release is sufficient to heat the benzene to its boiling point (176° F.) and to vaporize some of the benzene until the pressure in the reactor is increased to about 50 p.s.i.g. and the rupture disk is broken. The methanol then drains into the reactor within a few seconds and the catalyst is completely deactivated immediately, thereby preventing further polymerization with attendant heat release and pressure build-up. The pressure remains at a maximum of about 50 p.s.i.g. and the reactor is undamaged.

*Example III*

This example illustrates normal polymerization of a mixture of butadiene and styrene.

To a reactor of 3750 gallon capacity equipped with agitator and internal cooling coils and of a construction similar to that of FIGS. 1 and 2 of the drawings was added the following materials precooled to 41° F.

| | Lbs. |
|---|---|
| Butadiene | 6500 |
| Styrene | 2820 |
| Water | 15,300 |
| Soap | 382 |
| Para-menthane hydroperoxide | 10 |
| Sulfole | 15 |
| Activator solution (0.18% ferrous sulfate+ water) | 520 |

Polymerization started immediately and the heat of polymerization was removed by cooling medium in the cooling coils while maintaining a reaction temperature of 41° F. After 8 hours at 41° F. conversion of monomer reached 60%. At this time, 100 gallons of a solution of 0.6% sodium dimethylcarbamate and 0.6% sodium polysulfide (dry basis) in water is metered to the reactor to short-stop the catalyst and the reaction mixture is stripped of residual monomer, coagulated, washed and dried following conventional procedures.

There was no heat or pressure build-up during the above polymerization.

*Example IV*

The equipment and reactor charge of this example is the same as that of Example III, with the exception that the reactor is fitted with safety apparatus including vessel 31, conduit 37, rupture disk 43 and related apparatus as illustrated in FIGS. 1 and 2 of the drawings. The rupture disk 43 is set to rupture at 75 p.s.i.g and the vessel 31 contains 100 gallons of a solution prepared from (by weight):

| | Parts |
|---|---|
| Water | 98.25 |
| Sodium dimethyldithiocarbamate | 1.75 |

Loss of temperature control is simulated by reducing the flow of coolant to the tube bundles in the reactor until the rate of heat removal is not sufficient to prevent a rise in temperature of the reactor charge. As the pressure in the reactor reaches 75 p.s.i.g. due to temperature rise in the batch, the rupture disk designed to break at this pressure is ruptured, permitting the deactivator solution to drain into the reactor automatically and in the matter of a few seconds, thus deactivating the catalyst within not more than 5 minutes and preventing additional heat release with attendant pressure build-up. There is no damage to the reactor, and the batch may then be dropped and residual monomer recovered before disposing of the emulsion polymer.

What is claimed is:

1. In apparatus of the class including a pressure vessel, the improvement in means for passing material into the pressure vessel in response to the internal pressure thereof consisting essentially of container means for containing material to be added to the pressure vessel, conduit means extending between the pressure vessel and the container means for passing material from the container means into the pressure vessel, and means positioned in the conduit means between the pressure vessel and the container means for normally preventing passage of material from the container means into the pressure vessel, there being no communication between the interiors of the pressure vessel and the container means when in use effective to equalize the pressures therein as long as the means for preventing passage of the material is effective whereby the last named means is subjected to increasing pressure in a direction away from the pressure vessel with increasing pressure in the pressure vessel, the means for preventing passage of the material being rendered ineffective by pressure applied in a direction away from the pressure vessel when the internal pressure of the pressure vessel exceeds a predetermined level thereby allowing material to be passed from the container means into the pressure vessel.

2. In apparatus of the class including a pressure vessel, the improvement in means for passing liquid material into the pressure vessel in response to the internal pressure thereof consisting essentially of a second vessel for containing liquid material to be added to the pressure vessel, means including a conduit extending between the pressure vessel and the container means for passing liquid material from the second vessel into the pressure vessel, and means including a frangible member positioned in the conduit between the pressure vessel and the second vessel for normally preventing passage of liquid material from the second vessel into the pressure vessel, there being no communication between the interiors of the pressure vessel and the second vessel when in use effective to equalize the pressures therein as long as the frangible member is effective for preventing passage of liquid material from the second vessel into the pressure vessel whereby the frangible member is subjected to increasing pressure in a direction away from the pressure vessel with increasing pressure in the pressure vessel, the frangible member being broken and rendered ineffective by pressure applied in a direction away from the pressure vessel when the internal pressure of the pressure vessel exceeds a predetermined level thereby allowing liquid material to be passed from the second vessel into the pressure vessel.

3. In apparatus of the class including a pressure vessel for containing a first liquid, the pressure vessel being adapted to be partially filled with the first liquid with a vapor space above the liquid level, the improvement comprising a second vessel closed to the atmosphere for containing a second liquid to be added to the pressure vessel, the second vessel being adapted to be partially filled with the second liquid with a vapor space above the liquid level, means including a first conduit for passing liquid from the second vessel into the pressure vessel, means normally preventing passage of liquid from the second vessel into the pressure vessel, the last named means being rendered ineffective when the internal pressure of the pressure vessel exceeds a predetermined level thereby allowing the second liquid to be passed from the second vessel into the pressure vessel, and a second conduit in communication with the vapor space above the first liquid and the vapor space above the second liquid after the last named means is rendered ineffective to thereby aid in equalizing the pressure in the vapor spaces and allow the second liquid to be passed freely from the second vessel.

4. In apparatus of the class including a pressure vessel for containing a first liquid, the pressure vessel being adapted to be partially filled with the first liquid with a vapor space above the liquid level, the improvement comprising a second vessel closed to the atmosphere for containing a second liquid to be added to the pressure vessel, the second vessel being adapted to be partially filled with the second liquid with a vapor space above the liquid level, means including a first conduit for passing liquid from the second vessel into the pressure vessel, means including a frangible member in the first conduit normally preventing passage of liquid from the second vessel into the pressure vessel, the last named means being broken and rendered ineffective when the internal pressure of the pressure vessel exceeds a predetermined level thereby allowing the second liquid to be passed from the second vessel into the pressure vessel, and a second conduit in communication with the vapor space above the first liquid and the vapor space above the second liquid after the last named means is rendered ineffective to thereby aid in equalizing the pressure in the vapor spaces and allow the second liquid to be passed freely from the second vessel.

5. In apparatus of the class including a pressure vessel, the pressure vessel containing a liquid reaction mixture comprising material which is chemically reactive and releases heat upon reacting and a catalyst therefor, the material reacting chemically in the reaction mixture in the presence of the catalyst and releasing heat upon reaction, the reaction mixture containing volatile material which increases the internal pressure in the pressure vessel with an increase in temperature of the reaction mixture due to the reaction of the material with attendant release of heat, and the rate of reaction of the material being capable of being substantially reduced in the presence of an additive which when added to the reaction mixture deactivates the catalyst, the improvement in means for passing a catalyst deactivator into the pressure vessel is response to the integral pressure thereof consisting essentially of a second vessel, the second vessel containing a catalyst deactivator which deactivates the catalyst when added to the reaction mixture contained in the pressure vessel, means including a conduit extending between the pressure vessel and the second vessel for passing the catalyst deactivator from the second vessel into the reaction mixture, and means positioned in the conduit between the pressure vessel and the second vessel for normally preventing passage of the catalyst deactivator from the second vessel into the reaction mixture, there being no communication between the interiors of the pressure vessel and the second vessel when in use effective to equalize the pressures therein as long as the means for preventing passage of the catalyst deactivator is effective whereby the last named means is subjected to increasing pressure in a direction away from the pressure vessel with increasing pressure in the pressure vessel, the means for preventing passage of the catalyst deactivator being rendered ineffective by pressure applied in a direction away from the pressure vessel when the internal pressure of the pressure vessel exceeds a predetermined level thereby allowing the catalyst deactivator to pass from the second vessel into the reaction mixture and deactivate the catalyst.

6. In apparatus of the class including a pressure vessel, the pressure vessel containing a liquid reaction mixture comprising material which is chemically reactive and releases heat upon reacting and a catalyst therefor, the material reacting chemically in the reaction mixture in the presence of the catalyst and releasing heat upon reaction, the reaction mixture containing volatile material which increases the internal pressure in the pressure vessel with an increase in temperature of the reaction mixture due to the reaction of the material with attendant release of heat, and the rate of reaction of the material being capable of being substantially reduced in the presence of an additive which when added to the reaction mixture deactivates the catalyst, the improvement in means for passing a liquid catalyst deactivator into the pressure vessel in response to the internal pressure thereof consisting essentially of a second vessel, the second vessel containing a liquid catalyst deactivator which deactivates the catalyst when added to the reaction mixture contained in the pressure vessel, means including a conduit extending between the pressure vessel and the second vessel for passing the catalyst deactivator from the second vessel into the reaction mixture, and means including a frangible member positioned in the conduit between the pressure vessel and the second vessel for normally preventing passage of the catalyst deactivator from the second vessel into the reaction mixture, there being no communication between the interiors of the pressure vessel and the second vessel when in use effective to equalize the pressures therein as long as the frangible member is effective to prevent passage of the catalyst deactivator from the second vessel to the pressure vessel whereby the frangible member is subjected to increasing pressure in a direction away from the pressure vessel with increasing pressure in the pressure vessel; the frangible member being broken and rendered ineffective by pressure applied in a direction away from the pressure vessel when the internal pressure of the pressure vessel exceeds a predetermined level thereby allowing the catalyst deactivator to pass from the second vessel into the reaction mixture and deactivate the catalyst.

7. In apparatus of the class including a pressure vessel, the pressure vessel containing a liquid reaction mixture comprising material which is chemically reactive and releases heat upon reacting and a catalyst therefor, the pressure vessel being partially filled with the reaction mixture and having a vapor space above the liquid level, the material reacting chemically in the reaction mixture in the presence of the catalyst and releasing heat upon reaction, the reaction mixture containing volatile material which increases the internal pressure in the pressure vessel with an increase in temperature of the reaction mixture due to the reaction of the material with attendant release of heat, and the rate of reaction of the material being capable of being substantially reduced in the presence of an additive which when added to the reaction mixture deactivates the catalyst, the improvement comprising a second vessel closed to the atmosphere, the second vessel containing a liquid catalyst deactivator which deactivates the catalyst when added to the reaction mixture contained in the pressure vessel, the second vessel being partially filled with the catalyst deactivator and having a vapor space above the liquid level, means including a first conduit for passing the catalyst deactivator from the second vessel into the reaction mixture, means normally preventing passage of the catalyst deactivator from the second vessel into the reaction mixture, the last named means being rendered ineffective automatically when the internal pressure of the pressure vessel exceeds a predetermined level thereby allowing the catalyst deactivator to pass from the second vessel into the reaction mixture and deactivate the catalyst, and a second conduit in communication with the vapor space above the catalyst deactivator and the vapor space above the reaction mixture after the last named means is rendered ineffective to thereby aid in equalizing the pressure in the vapor spaces and allow the catalyst deactivator to pass freely from the second vessel.

8. In apparatus of the class including a pressure vessel, the pressure vessel containing a liquid reaction mixture comprising material which is chemically reactive and releases heat upon reacting and a catalyst therefor, the pressure vessel being partially filled with the reaction mixture and having a vapor space above the liquid level, the material reacting chemically in the reaction mixture in the presence of the catalyst and releasing heat upon reaction, the reaction mixture containing volatile material which increases the internal pressure in the pressure vessel with an increase in temperature of the reaction mixture due to the reaction of the material with attendant release of heat, and the rate of reaction of the material being capable of being substantially reduced in the presence of an additive which when added to the reaction mixture deactivates the catalyst, the improvement comprising a second vessel closed to the atmosphere, the second vessel containing a liquid catalyst deactivator which deactivates the catalyst when added to the reaction mixture contained in the pressure vessel, the second vessel being partially filled with the catalyst deactivator and having a vapor space above the liquid level, means including a first conduit for passing the catalyst deactivator from the second vessel into the reaction mixture, means including a frangible member in the first conduit normally preventing passage of the catalyst deactivator from the second vessel into the reaction mixture, the last named means being broken and rendered ineffective automatically when the internal pressure of the pressure vessel exceeds a predetermined level thereby allowing the catalyst deactivator to pass from the second vessel into the reaction mixture and deactivate the catalyst, and a second conduit in communication with the vapor space above the catalyst deactivator and the vapor space above the reaction mixture after the last named means is rendered ineffective to thereby aid in equalizing the pressure in the vapor spaces and allow the catalyst deactivator to pass freely from the second vessel.

9. In apparatus of the class including a pressure vessel, the pressure vessel containing a liquid polymerization mixture comprising at least one polymerizable olefin and a polymerization catalyst therefor, the polymerizable olefin polymerizing in the presence of the catalyst and releasing heat, the polymerization mixture containing volatile material which increases the internal pressure in the pressure vessel with an increase in temperature of the polymerization mixture due to the polymerization of the olefin with attendant release of heat, and the rate of polymerization being capable of being substantially reduced in the presence of an additive which when added to the polymerization mixture deactivates the catalyst, the improvement in means for passing a catalyst deactivator into the pressure vessel in response to the internal pressure thereof consisting essentially of a second vessel, the second vessel containing a catalyst deactivator which deactivates the catalyst when added to the reaction mixture contained in the pressure vessel, means including a conduit extending between the pressure vessel and the second vessel for passing the catalyst deactivator from the second vessel into the polymerization mixture, and means positioned in the conduit between the pressure vessel and the second vessel for normally preventing passage of the catalyst deactivator from the second vessel into the polymerization mixture, there being no communication between the interiors of the pressure vessel and the second vessel when in use effective to equalize the pressures therein as long as the means for preventing passage of the catalyst deactivator is effective whereby the last named means is subjected to increasing pressure in a direction away from the pressure vessel with increasing pressure in the pressure vessel, the means for preventing passage of the catalyst deactivator being rendered ineffective by pressure applied in a direction away from the pressure vessel when the internal pressure of the pressure vessel exceeds a predetermined level thereby allowing the catalyst deactivator to pass from the second vessel into the polymerization mixture and deactivate the catalyst.

10. The apparatus of claim 9 wherein the means for passing the catalyst deactivator from the second vessel into the polymerization mixture includes first and second conduits, the first conduit leading from the second vessel and being in communication with the interior thereof and the interior of the second conduit, the second conduit having a larger diameter than the first conduit, the second conduit being connected at one end to the exterior portion of the second vessel whereby it is not in communication with the interior thereof, the first conduit being arranged within the second conduit whereby a space is formed between an internal portion of the second conduit and an external portion of the first conduit, the second conduit being in communication with the interior of the first vessel when the means for normally preventing passage of the catalyst deactivator from the second vessel into the polymerization mixture is rendered ineffective, the means for normally preventing passage of catalyst deactivator including a frangible member in the second conduit, the frangible member being broken and rendered ineffective for preventing passage of the catalyst deactivator when the internal pressure of the pressure vessel exceeds a predetermined level, the first conduit terminating within the interior of the second conduit and between the frangible member and the second vessel, the pressure vessel being partially filled with the polymerization mixture whereby a vapor space is provided therein, the second vessel being partially filled with the catalyst deactivator whereby a vapor space is provided therein, and a third conduit in communication with the vapor spaces in the pressure vessel and the second vessel after the means for preventing passage of the catalyst deactivator has been rendered ineffective to thereby aid in equalizing the pressure in the vapor spaces and allow the catalyst deactivator to pass freely from the second vessel.

References Cited in the file of this patent

UNITED STATES PATENTS

| | | |
|---|---|---|
| 1,188,530 | Bosch | June 27, 1916 |
| 1,902,046 | Raines | Mar. 21, 1933 |
| 2,665,197 | Rowland | Jan. 5, 1954 |
| 2,702,798 | Burleigh | Feb. 22, 1955 |
| 2,871,106 | Crowley et al. | Jan. 27, 1959 |
| 2,915,507 | Uraneck | Dec. 1, 1959 |
| 2,921,057 | Mertzweiller | Jan. 12, 1960 |
| 2,940,963 | Denkowski | June 14, 1960 |
| 2,955,926 | Illich et al. | Oct. 11, 1960 |